3,145,192
ACETYLENIC POLYURETHANES USEFUL
AS PROPELLANTS
Donald D. Perry, Morristown, and Rita M. Dudak, Hibernia, N.J., assignors, by mesne assignments, to Thiokol Chemical Corporation, a corporation of Delaware
No Drawing. Filed July 1, 1957, Ser. No. 669,912
22 Claims. (Cl. 260—77.5)

This invention relates to acetylenic polyurethanes, and more particularly (1) to methods of preparing the same, (2) to products of said methods, and (3) to high-energy, solid propellant compositions containing said products as fuel ingredients.

A principal object of our invention is to prepare high-energy fuel binders, possessing properties which adapt them for use in solid rocket propellants.

Another object is to prepare such fuel binders from starting materials in the form of novel, linear acetylenic ether polymers, of which we are co-inventors with another; said polymers being the subjects of one or more separate patent applications.

Another object is to effect chain extension and cross-linking of said linear polymers through addition reactions with other compounds, so as to yield solid products which may be cast or compression-molded into slabs, and which possess combined elasticity and flexibility sufficient to render such products useful as essential fuel-binder components of solid, rocket-propellant compositions.

Other objects and advantages of our invention will appear as the description thereof proceeds.

The linear, acetylenic ether polymers, employed as starting materials in the practice of the instant invention, are prepared by reacting acetylenic glycols wtih dialkyl ethers (acetals) or aldehydes, in the presence of a strong acid catalyst, such as p-toluene-sulfonic acid. Examples of this polymer are poly(2-butyne-1,4-dioxymethylene) and poly(2 - butyne - 1,4 - dioxyethylidene). These polymers may be obtained as low-melting waxy solids (M.P. about 60° C.), of molecular weight from about 550 to about 2400.

Our acetylenic ether polymers contain hydroxyl groups at the ends of the chains. We have found that these polymers can enter into chain-extension reactions with organic diisocyanates, both aliphatic and aromatic, to yield linear polyurethanes; the reaction involving a simple addition of the hydroxyls in the acetylenic ether polymer to the

—N=C— bonds of the diisocyanate.

The initially formed linear polyurethane can react, under suitable conditions, with an excess of the diisocyanate to produce a cross-linked polymer. Other compounds may also be added to promote the cross-linking reactions. These include diamines and aminoalcohols, such as hexamethylenediamine (HMD) and ethanolamine (EA). These may be added to the reaction mixture simultaneously with the addition of the diisocyanate, or they may be added after the polymerization reaction has proceeded for some time.

Hereinafter we ordinarily shall use the abbreviation for a specific compound which is set out in parentheses.

The diisocyanates, which we have employed in the practice of this invention, are alkyl-, aryl-, and alkoxy-aryldiisocyanates, such as, for example:

(1) Dianisidine diisocyanate (DADI).
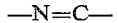
(2) Hexamethylene-1, 6-diisocyanate (HDI).
(3) 4,4'-diisocyanatodiphenylmethane (MDI).
(4) 2,4-toluene diisocyanate (TDI).
(5) 3,3'-bitolylene-4,4'-diisocyanate (TODI).

The reaction, leading to the formation of an acetylenic polyurethane, can be effected either in solution or in bulk. As solvents for the reactants we have employed benzene, ethylene bromide, and toluene. We have found, however, that the bulk reaction proceeds much more rapidly, and generally yields products with superior physical properties, that is, possessing greater toughness and elasticity.

In the following examples our preferred acetylenic ether polymer starting material, namely, poly(2-butyne-1,4-dioxymethylene), ordinarily will be designated herein by the abbreviation PBDM.

All temperatures recited herein are in degrees centigrade.

Statements herein, which relate to equivalent quantities or to ratios or proportions of equivalents of named materials, are based upon the molar value of a reference material, usually the polymer PBDM.

Reactions carried out in a solvent are illustrated in Example I.

EXAMPLE I.

(A) A quantity of PBDM, of molecular weight 580, was heated for 18.5 hours with 1.94 equivalents of TDI in refluxing toluene at a temperature of 110°. At the end of the reaction period the toluene was distilled off, leaving a clear, tough, rubbery solid. The properties of this solid indicated that it was a cross-linked polyurethane. It supported its own combustion, burning brightly with a smoky flame.

(B) Equivalent quantities of PBDM, of molecular weight 1300, and of HDI, and about 0.1 equivalent of triethylamine as a catalyst were reacted for 50 hours in refluxing toluene at a temperature of 110°. Then a 100 percent excess of HDI, on a molar basis, was added to the reaction mixture; and heating was continued for an additional period of 40 hours in refluxing ethylene bromide at 130°. A quite rubbery, though not extremely tough, product was obtained.

Chain-extension and cross-linking reactions, carried out in bulk, are illustrated in Example II.

EXAMPLE II

In each of the experiments described in this Example II the reactants named were mixed together before being heated. In each experiment the resulting cross-linked, acetylenic polyurethane was a tough, rubbery solid.

(A) Five grams of PBDM, of molecular weight 2300, were melted in a 50-ml. round-bottom flask. To the molten, waxy polymer were added 1.27 equivalents (0.47 gram) of HDI and 3 drops of triethylamine. The mixture was heated in an oil bath for 17 hours at 110° to 120°.

(B) To a quantity of PBDM, of molecular weight 1000, were added 1.2 equivalents of MDI and 0.05 equivalent of HMD. The mixture was heated for 6 hours at 110°.

A determination of the heat of combustion of the tough, rubbery solid, obtained in this experiment (B) yielded a value of 6.19 kilocalories per gram. It may be concluded, therefore, that our acetylenic polyurethanes are suitable for use as fuel binders in high-energy solid propellants.

(C) To a quantity of PBDM, of molecular weight 1200, were added 1.25 equivalents of MDI and 0.25 equivalent of HMD. The mixture was heated for 3 hours at 90°.

(D) To a quantity of PBDM, of molecular weight 1400, were added 1.4 equivalents of TDI and 0.4 equivalent of EA. The mixture was heated for one hour at 100°.

(E) To a quantity of PBDM, of molecular weight 1870, were added 1.25 equivalents of TDI and 0.13 equivalent of HMD. The mixture was heated for 4.5 hours at temperatures from 100° to 120°.

(F) To a quantity of PBDM, of molecular weight 850, were added 1.3 equivalents of TDI and, in sequence, 0.15 equivalent of HMD and 0.15 equivalent of EA. The mixture was heated for 4 hours at 110°.

When this experiment (F) was repeated, except that the EA was added prior to the addition of the HMD, there was no apparent difference in the results obtained.

(G) To a quantity of PBDM, of molecular weight 1400, were added one equivalent of TODI and 0.2 equivalent of EA. The mixture was heated for one hour at 120°.

(H) To a quantity of PBDM, of molecular weight 1400, were added 1.3 equivalents of DADI and 0.05 equivalent of HMD. The mixture was heated for 9.25 hours at temperatures of 120° to 130°.

The results of many bulk reactions, as distinguished from reactions in solution, of which the foregoing bulk tests (A) to (H) under Example II are illustrative only, indicate that heating times and reaction temperatures are dependent to a variable extent (1) upon the molecular weight of the acetylenic polymer starting material; (2) upon the specific diisocyanate, and the proportion thereof, employed; and (3) upon the particular amino compound, and the proportion thereof, used as a cross-linking agent.

We prefer to carry out the chain-extending, cross-linking addition reaction, as illustrated in Example II, at a temperature between 100° and 125°; although the temperature range may be from 90° to 130°.

Propellant Compositions Containing the Novel Acetylenic Polyurethanes

Economy of operation in the preparation of solid rocket propellants, in which our novel acetylenic polyurethanes are to be the essential fuel-binder components, calls for the synthesis of such polyurethanes in reaction mixtures in which an oxidizer comprises a major but substantially inert component during the synthesis; and in which no volatile by-products are formed. In general, our method of producing a solid rocket propellant of this character is the following:

A quantity of one of our linear, acetylenic ether polymers, of molecular weight preferably above 1400, is melted in a container heated in an oil bath maintained at a temperature of about 110°. About 1.3 equivalents of a suitable diisocyanate then are added to the melt. After the heating has been continued for about 10 to 30 minutes, there is added an amount of a diamine or amino-alcohol sufficient to react with all or a part of the excess of diisocyanate; the temperature being maintained at its previous level. Within a few minutes after the addition of the amino compound a considerable increase in the viscosity of the system occurs; and so, immediately following such addition, an oxidizer, preferably ammonium perchlorate, is mixed with the thickening polymer. Addition of oxidizer is continued until its further homogeneous incorporation in the mix becomes impossible. The putty-like mass then is compressed in a flat mold, and cured at temperatures of 110° to 130° for about 3 to 18 hours.

Oxidizer loadings of 56 percent to 75 percent have been obtained. A stoichiometric loading would be about 84 percent of the oxidizer.

Illustrative experiments, employing the general method described next above, are set forth under Example III. Unless stated otherwise, the oxidizer was ammonium perchlorate.

EXAMPLE III (A) PBDM, 21.6 parts by weight, TDI, 3.1 parts (one equivalent each of PBDM and TDI, on a molar basis), HMD, about 3 parts, and oxidizer, 75.3 parts, were processed in accordance with the aforedescribed method. The compression-molded mix was cured at 112° for 3 hours. The product was very hard, and burned fast and clean.

(B) A quantity (22.7 parts) of PBDM, of molecular weight 1450, 1.3 equivalents (3.6 parts) of TDI, about 0.1 equivalent each of EA and HMD, and 73.7 parts of oxidizer were processed as above described. The compression-molded mix was cured at 110° for 16 hours. The product was a hard, uniform smooth-burning composition.

(C) A quantity (36.3 parts) of PBDM, of molecular weight 1635, 1.3 equivalents (5.0 parts) of TDI, about 0.15 equivalent of HMD, and 58.7 parts of ammonium nitrate were processed as above described. The compression-molded mix was cured at 110° for 18 hours. The product possessed more rubbery properties than did compositions prepared under otherwise like conditions, except for the substitution of ammonium nitrate for ammonium perchlorate as the oxidizer.

(D) A quantity (23.1 parts) of PBDM, of molecular weight 1635, 1.3 equivalents (4.5 parts) of MDI, about 0.15 equivalent of HMD, and 72.4 parts of oxidizer were processed as described above. The compression-molded mix was cured at 110° for 18 hours. The product was hard and brittle at room temperature.

(E) A quantity (23.4 parts) of PBDM, of molecular weight 1640, 1.6 equivalents (4.0 parts) of TDI, about 0.2 equivalent of HMD, 0.5 part of ferric acetylacetonate as a catalyst, and 72.6 parts of oxidizer were processed substantially in the manner described above. The compression-molded mix was cured at 130° for 3 hours. The product, which became hard and brittle upon cooling exhibited fast, smooth burning properties.

(F) A quantity (31.5) parts PBDM, of molecular weight 1640, 1.3 equivalents (7.9 parts) of MDI, about 0.15 equivalent of HMD, 0.5 part of ferric acetylacetonate, and 61.0 parts of oxidizer were processed substantially as described above. The compression-molded mix was cured at 130° for 4 hours. The product possessed good flexural and elastic properties.

*Oxidizers.*—In addition to ammonium perchlorate and ammonium nitrate, other inorganic oxidizers, which may be used in forming the hereindescribed propellant compositions, are: Aluminum chlorate and perchlorate, and the chlorates, nitrates, and perchlorates of the alkali metals and of the alkaline earth metals.

*Burning rate tests.*—A Crawford-type solid propellant strand burner was used in determining the burning rates of strips cut from rectangular slabs of our acetylenic polyurethane propellants. Burning rates were determined at room temperature, in the range of 200 to 4000 p.s.i.g. of nitrogen pressure.

The fastest burning rate was shown by composition (D) in Example III; this rate being 1.15 in./sec. at 1000 p.s.i.g.

The burning rate of composition (E) in Example III was found to be 0.78 in./sec. at 1000 p.s.i.g.

It is to be understood that various modifications and changes in detail in the aforedescribed means and methods may be made without departing from the spirit of our invention; and that all reactants, quantities and proportions, and process steps and conditions recited hereinabove are intended to be illustrative only, and in no sense limitative of the invention other than as the same is defined in the accompanying claims.

What is claimed is:

1. The method of producing an acetylenic polyurethane which comprises, mixing a quantity of poly(2-butyne-1,4-dioxymethylene) with from one to two molar equivalents, based on said poly(2-butyne-1,4-dioxymethylene), of 2,4-toluene diisocyanate; dissolving the mixture in a solvent of the class consisting of benzene, ethylene bromide, and toluene; causing addition reaction of said poly(2-butyne-1,4-dioxymethylene with said diisocyanate by boiling the solution while refluxing the solvent; separating the solvent from the solution after a period of boiling exceeding 18 hours, and recovering a solid polyurethane.

2. The method as defined in claim 1, wherein the 2,4-toluene diisocyanate is substituted by hexamethylene-1,6-diisocyanate.

3. The method of producing an acetylenic polyurethane which comprises, forming a mixture of poly(2-butyne-1,4-dioxymethylene) with from one to two molar equivalents, based upon the quantity of said poly(2-butyne-1,4-dioxymethylene), of 2,4-toluene diisocyanate; and causing addition reaction of said poly(2-butyne-1,4-dioxymethylene) with said diisocyanate, to form a polyurethane, by heating the mixture at a temperature in the range from about 90° C. to about 130° C. for about one hour to about 18 hours.

4. The method as defined in claim 3, wherein the 2,4-toluene diisocyanate is substituted by hexamethylene-1,6-diisocyanate.

5. The method of producing an acetylenic polyurethane which comprises, forming a mixture of poly(2-butyne-1,4-dioxymethylene) with from one to two molar equivalents, based upon the quantity of said poly(2-butyne-1,4-dioxymethylene), of 2,4-toluene diisocyanate, and from about 0.02 to about 0.5 equivalent of a cross-linking means in the form of a diamine; and causing a chain-extending, cross-linking, addition reaction by heating the mixture at a temperature in the range from about 90° C. to about 130° C. for about one hour to about 18 hours.

6. The method as defined in claim 5, wherein the 2,4-toluene diisocyanate is substituted by hexamethylene-1,6-diisocyanate, and the cross-linking means is an amino-alcohol.

7. The method of producing an acetylenic polyurethane which comprises, forming a mixture of an hydroxy-terminated acetylenic hydrocarbon ether polymer and from one to two molar equivalents, based upon the quantity of said polymer, of a chain-extending and cross-linking reagent in the form of an organic diisocyanate selected from the group consisting of alkyl-, aryl-, and alkoxyaryldiioscyanates; dissolving the mixture in a solvent of the class consisting of benzene, ethylene bromide, and toluene; causing addition reaction of said polymer with said diisocyanate by boiling the solution while refluxing the solvent; separating the solvent from the mixture after a period of boiling exceeding 18 hours, and recovering a solid polyurethane.

8. The method of producing an acetylenic polyurethane which comprises, forming a mixture of a hydroxy-terminated acetylenic hydrocarbon ether polymer and from one to two molar equivalents, based upon the quantity of said polymer, of a chain-extending and cross-linking reagent in the form of an organic diisocyanate selected from the group consisting of alkyl-, aryl-, and alkoxyaryl-diisocyanates; and causing addition reaction of said polymer with said diisocyanate, to form a polyurethane, by heating the mixture at a temperature in the range from about 90° C. to about 130° C. for about 1 hour to about 18 hours.

9. The method of producing an acetylenic polyurethane which comprises, forming a mixture of a hydroxy-terminated acetylenic hydrocarbon ether polymer with a chain-extending and cross-linking reagent in the form of an organic diisocyanate selected from the group consisting of alkyl-, aryl-, and alkoxyaryldiisocyanates, and heating the mixture at a temperature and for a time period sufficient to effect addition reaction of the polymer and the diisocyanate, and to form a polyurethane.

10. The method as defined in claim 9 which includes the step of adding to the mixture another cross-linking reagent in the form of an amino compound selected from the group consisting of diamines and amino alcohols.

11. A polyurethane product prepared by the process of claim 9.

12. The method of claim 9 wherein said organic diisocyanate is dianisidine diisocyanate.

13. The method of claim 9 wherein said organic diisocyanate is 4,4-diisocyanatodiphenylmethane.

14. The method of claim 9 wherein said organic diisocyanate is hexamethylene-1,6-diisocyanate.

15. The method of claim 9 wherein said organic diisocyanate is 2,4-toluene diisocyanate.

16 The method of claim 9 wherein said organic diisocyanate is 3,3'-bitolylene-4,4'-diisocyanate.

17. A polyurethane product prepared by the process of claim 10.

18. The method of claim 10 wherein said organic diisocyanate is dianisidine diisocyanate.

19. The method of claim 10 wherein said organic diisocyanate is 4,4'-diisocyanatodiphenylmethane.

20. The method of claim 10 wherein said organic diisocyanate is hexamethylene-1,6-diisocyanate.

21. The method of claim 10 wherein said organic diisocyanate is 2,4-toluene diisocyanate.

22. The method of claim 10 wherein said organic diisocyanate is 3,3'-bitolylene-4,4'-diisocyanate.

References Cited in the file of this patent

UNITED STATES PATENTS

| | | |
|---|---|---|
| 2,643,184 | Cairns | June 23, 1953 |
| 2,653,144 | Wielicki | Sept. 22, 1953 |
| 2,692,874 | Langerak | Oct. 26, 1954 |
| 2,744,816 | Hutchison | May 8, 1956 |
| 2,808,391 | Pattison | Oct. 1, 1957 |
| 2,854,486 | McShane | Sept. 30, 1958 |

UNITED STATES PATENT OFFICE
CERTIFICATE OF CORRECTION

Patent No. 3,145,192                                    August 18, 1964

Donald D. Perry et al.

It is hereby certified that error appears in the above numbered patent requiring correction and that the said Letters Patent should read as corrected below.

Column 4, line 74, for "1,4-dioxymethylene" read -- 1,4-dioxymethylene) --; column 6, line 24, for "4,4-diisocyanatodiphenylmethane" read -- 4,4′-diisocyanatodiphenylmethane --.

Signed and sealed this 1st day of December 1964.

(SEAL)
Attest:

ERNEST W. SWIDER                                    EDWARD J. BRENNER
Attesting Officer                                        Commissioner of Patents